(12) United States Patent
Murphy et al.

(10) Patent No.: US 6,856,683 B1
(45) Date of Patent: Feb. 15, 2005

(54) METHOD FOR REDUCING NOISE FROM A NON-LINEAR DEVICE THAT SHARES A CUSTOMER LOOP WITH AN ASYMMETRIC DIGITAL SUBSCRIBER LINE MODEM

(75) Inventors: Tim Murphy, Ramona, CA (US); Martin Staszak, Poway, CA (US)

(73) Assignee: 3Com Corporation, Marlborough, MA (US)

( * ) Notice: Subject to any disclaimer, the term of this patent is extended or adjusted under 35 U.S.C. 154(b) by 475 days.

(21) Appl. No.: 09/795,991

(22) Filed: Feb. 28, 2001

(51) Int. Cl.$^7$ .............................. H04M 1/00; H04M 9/00
(52) U.S. Cl. ............................. 379/390.01; 379/392.01; 379/1.03
(58) Field of Search .......................... 379/93.01, 92.04, 379/406.14, 394, 398, 416, 388.03, 1.03, 390.01, 392.01

(56) References Cited

U.S. PATENT DOCUMENTS 5,265,151 A * 11/1993 Goldstein ................ 379/93.32
6,456,650 B1 * 9/2002 Cheng et al. ............... 375/222

OTHER PUBLICATIONS

ITU–T Reccommendation G.992.2 (06/99)—Splitterless asymmetric digital subscriber line (ADSL) transceivers. (no pages on document) relevent sections: 12.1,11.10.8, 12.3.5, 3.1.19–3.1.24.*

ITU–Telecommunication Standardization Sector, Jan. 18–22, 1999, Draft Recommendation G.992.2, pp. 1–152.
ITU–Telecommunication Standardization Sector, Oct. 12–23, 1998, G.994.1 Draft Document, pp. 1–35.
Tamperer University of Technology Telecommunication Laboratory, Feb. 17, 1995, ADSL, pp. 1–20.
ITU–T Recommendation G.992.2 (06/99)—Splitterless asymmetric digital subscriber line (ADSL) transceivers.
ITU–T Recommendation G.994.1 (06/99)—Handshake procedures for digital subscriber line (DSL) transceivers.

* cited by examiner

Primary Examiner—Curtis Kuntz
Assistant Examiner—Alexander Jamal
(74) Attorney, Agent, or Firm—McDonnell Boehnen Hulbert & Berghoff LLP

(57) ABSTRACT

A method for reducing noise from a non-linear device, such as a telephone, that shares a customer loop with a splitterless Asymmetric Digital Subscriber Line modem. The non-linearity of the device can cause some of the upstream signal to bleed into the downstream signal band. The modem examines the downstream band when it is transmitting fast retrain signals. By comparing the power in the band to a previous value when the modem transmitted upstream at a higher power level, the modem may determine whether to cut back its transmitted power to lessen the noise in the downstream band. In this manner, the method may allow optimal downstream data transfer regardless of what non-linear device shares the customer loop with the ADSL modem.

17 Claims, 6 Drawing Sheets

METHOD FOR REDUCING NOISE FROM A NON-LINEAR DEVICE THAT SHARES A CUSTOMER LOOP WITH AN ASYMMETRIC DIGITAL SUBSCRIBER LINE MODEM

FIELD OF INVENTION

The present invention relates to communication over a subscriber line. More specifically, it relates to a method for reducing noise from a non-linear device that shares a telephone loop with a splitterless Asymmetric Digital Subscriber Line modem.

BACKGROUND OF THE INVENTION

Digital Subscriber Line ("DSL") is a developing modem technology that allows existing copper telephone lines to carry high bandwidth information. Familiar twisted-pair telephone lines are then able to carry high speed data communication to and from a customer site in addition to retaining a plain old telephone service ("POTS") channel for voice communication. At the customer site, a DSL modem receives the downstream signal representing data for a customer from a central office for a telephone company and transmits an upstream signal representing data from the customer to the central office.

One configuration of DSL is generally termed Asymmetric Digital Subscriber Line ("ADSL"). ADSL allows high-speed data transport to the customer site but only medium-speed data transfer from the customer site, whence the asymmetry. ADSL also allows the simultaneous use of the ADSL modem and POTS on the same telephone line. In this configuration, at a point where the twisted-pair telephone line enters the customer site, filters split the POTS channel from the ADSL modem channels. One problem with this type of ADSL, however, is that a technician from the telephone company has to visit the customer site and install the splitter, referred to as "the truck roll."

To overcome this problem, another configuration of ADSL forgoes the requirement of a splitter at the customer site. This configuration is generally called "splitterless ADSL" and also goes under the name of "G.Lite." Splitterless ADSL is described in the International Telecommunications Union-Telecommunication Standardization Sector (hereinafter "ITU-T", formerly known as the CCITT) Recommendation G.992.2, February 1999, which is incorporated herein by reference. ITU-T standards can be found on the World Wide Web at the Universal Resource Locator ("URL") "www.itu.ch." Splitterless ADSL modems include those manufactured by 3Com Corporation of Santa Clara, Calif., Lucent Technologies of Murray Hill, N.J., Texas Instruments of Dallas, Tex., and others.

In splitterless ADSL, an ADSL modem directly shares the same twisted-pair telephone line as a POTS telephone without the intervention of a splitter. Sharing the same twisted-pair telephone line, however, may introduce noise into the downstream data transfer. The noise effect is the response of the internal circuitry of the telephone both in the on-hook and off-hook conditions to the upstream ADSL signal. Indeed, any non-linear device sharing the telephone line may introduce noise into the downstream data transfer. Moreover, each telephone or non-linear device has a different response to the upstream ADSL signal: some devices introduce little downstream noise, such as many of the cordless telephones, while others devices introduce a lot of noise, thus severely reducing the rate at which the modem can receive data.

It is desirable, therefore, to reduce the noise that the non-linear device, such as a telephone, introduces when it shares the telephone line with the modem. It is also desirable to achieve noise reduction for a wide range of non-linear devices. This may allow optimal downstream data transfer regardless of what non-linear device shares the telephone line with the ADSL modem.

SUMMARY OF THE INVENTION

In accordance with preferred embodiments of the present invention, some of the problems associated with overcoming noise introduced by a non-linear device are overcome. The modem implements a power cutback to reduce the amount of noise that the non-linear device introduces into the downstream signal.

One aspect of the invention includes a method for reducing noise from a non-linear device that shares a customer loop with a splitterless Asymmetric Digital Subscriber Line modem. The method includes measuring a current noise characteristic for the customer loop. The current noise characteristic is measured by the modem. The modem makes a determination as to whether the current noise characteristic is within a comparison level of a previous noise characteristic. When the determination is that the current noise characteristic is not within the comparison level of the previous noise characteristic, the modem limits transmitted power by an amount equal to a power cutback value. In this manner, the method may allow optimal downstream data transfer regardless of what model of non-linear device shares the customer loop with the ADSL modem.

The foregoing and other features and advantages of preferred embodiments of the present invention will be more readily apparent from the following detailed description, which proceeds with reference to the accompanying drawings.

BRIEF DESCRIPTION OF THE DRAWINGS

Preferred embodiments of the present invention are described with reference to the following drawings, wherein.

APPENDIX

The attached appendix includes computer source code for implementing the preferred embodiments described herein.

DETAILED DESCRIPTION OF PREFERRED EMBODIMENTS

Figure 1:
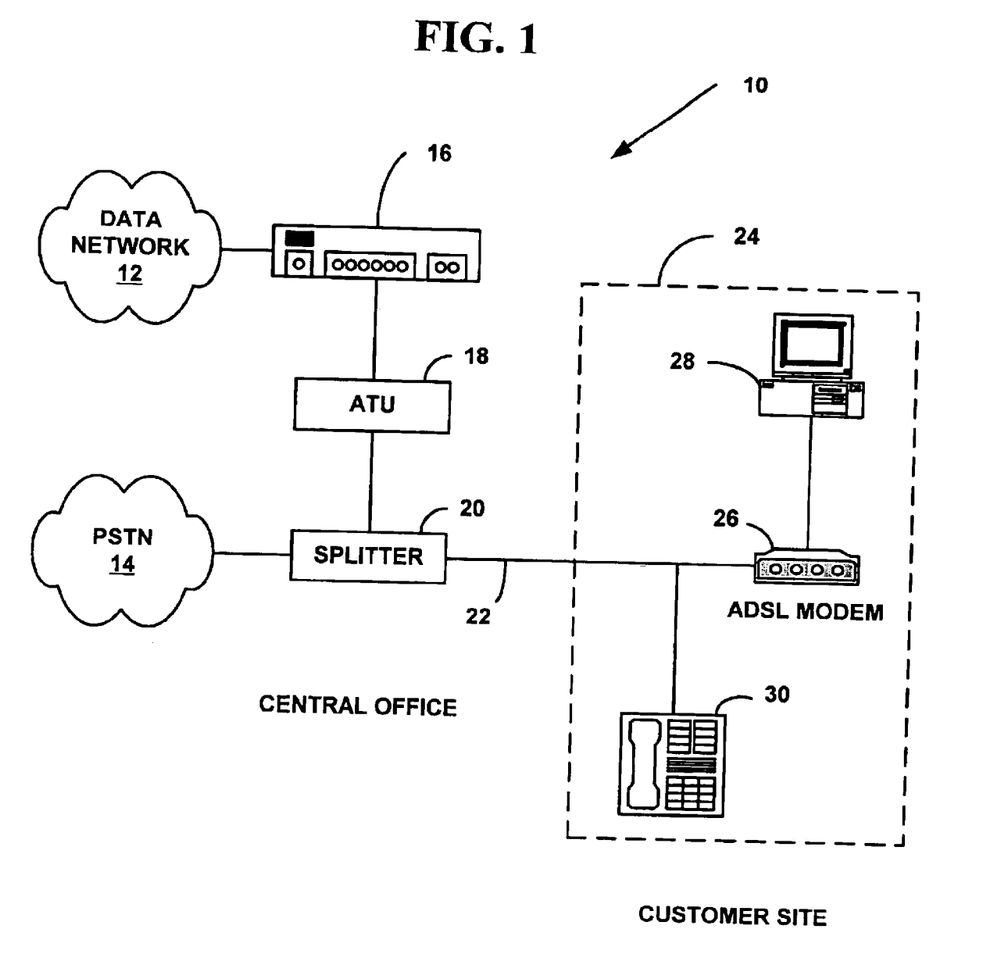
FIG. 1 is a block diagram illustrating a splitterless ADSL system.

FIG. 1 is a block diagram illustrating a splitterless ADSL system 10. The system 10 allows digital communications from a data network 12 and analog telephone signals from a Public Switched Telephone Network ("PSTN") 14 to be combined and sent to a customer site 24 over a customer telephone loop 22 comprising twisted-pair copper wire. The PSTN 14 includes, for example, those public switched telephone networks provided by AT&T, the Regional Bell Operating Companies (e.g., Ameritech, U.S. West, Bell Atlantic, Southern Bell Communications, Bell South, NYNEX, and Pacific Telesis Group), GTE, and others.

A concentrator 16 receives the digital data communications. The concentrator 16 is typically located at a telephone company's central office ("CO"). The data network 12 may be a local area network ("LAN"), a wide area network ("WAN"), or combination of the foregoing. For example, data network 12 may be the Internet and the concentrator 16 may be a network hub that receives Internet Protocol packets and routes them to a particular network device connected to the network hub. Alternatively, the concentrator 16 may be a DSL Access Multiplexer ("DSLAM") that links many ADSL data lines to the data network 12. The concentrator 16 sends the data intended for the customer site 24 to an ADSL Transceiver Unit 18 ("ATU"), which converts it to an ADSL signal.

A functional description of the conversion of data to an ADSL signal in the ATU 18 is to be found in ITU-T Recommendation 992.2. The ATU 18 takes the data from the concentrator 16 and frames the data Thereafter, the ATU 18 applies a cyclic redundancy check, scrambling, forward error correction, coding and interleaving. The ATU 18 then combines the data stream into a data symbol that is input to a constellation encoder. After constellation encoding, the ATU 18 modulates the data to produce an analog signal for transmission to the customer site 24 across the customer loop 22 via the splitter 20. The G.Lite signal permits high-speed downstream transfer of digital data from the central office to the customer site 24 at rates up to 1.536 Megabits per second ("Mbps"), depending primarily upon the length of the customer loop 22.

The G.Lite high-speed downstream signal occupies a frequency range of approximately 138 to 552 kiloHertz ("kHz"). Analog voice signals from the PSTN 14, in contrast, occupy a low frequency range of approximately zero to 4 kHz. A frequency splitter 20 in the central office combines the high frequency G.Lite signal from the ATU 18 and the low frequency analog signal from the PSTN 14. The splitter 20 then sends the combined signal over the customer loop 22 to the customer site 24.

At the customer site 24, the customer loop 22 from the central office connects to copper wiring within the customer site 24. For example, the copper wiring may be an internal home wiring system having multiple standard wall telephone outlets. A POTS telephone or other non-linear device ("NLD") 30 and an ADSL modem 26 may be attached to the same internal copper wiring. Examples of NLDs 30 that may be attached to the customer loop 22 include analogue modems, answering machines, fax machines, security systems, and Internet appliances. It should be understood that the non-linear devices 30 of the present invention are not limited to the telephones or the above-mentioned devices, and that many more non-linear devices are possible.

Importantly, in the G.Lite version of ADSL, the customer site 24 does not have a splitter for isolating the POTS analog signal from the high-frequency G.Lite signal. Thus for splitterless ADSL, both POTS telephones or other NLDs 30 and ADSL modems 26 may be plugged into the same standard telephone outlets, thereby avoiding the expense and delay of a visit by a technician from the telephone company for the purpose of installing the splitter. The ADSL modem 26 demodulates the G.Lite signal into data, and forwards the data to customer premise equipment 28, e.g. a personal computing, multimedia, or video device.

Similarly, in the upstream channel from the customer site 24 to the central office, the ADSL modem 26 may receive data from the customer premise equipment 28 and convert the data to an ADSL signal which the modem 26 places on the customer loop 22. At the same time, an off-hook telephone or NLD 30 may send analog signals to the PSTN 14 via the customer loop 22. These analog signals from the NLD 30 or telephone are typically in the low frequency range of approximately zero to 4 kHz. The G.Lite upstream signal, however, occupies a higher frequency range of approximately 26 to 134 kHz, providing medium-speed upstream data transfer at rates up to 512 kilobits per second ("kbps"). The customer loop 22 carries both the high frequency G.Lite signal from the ADSL modem 26 and the low frequency analog signal from the NLD 30 to the central office.

At the central office, the splitter 20 passes the low-frequency analog signals to the PSTN 14 and passes the high-frequency G.Lite signal to the ATU 18. The ATU 18 demodulates the G.Lite signal into data, passes the data to the concentrator 16, which then sends the data to the data network 12.

An operating environment for the modems and ATUs of the preferred embodiments, such as the ADSL modem 26 and the ATU 18, includes a processing system with at least one Central Processing Unit ("CPU") and a memory. In accordance with the practices of persons skilled in the art of computer programming, the present invention is described below with reference to acts and symbolic representations of operations or instructions that are performed by the processing system, unless indicated otherwise. Such acts and operations or instructions may be referred to as being "computer-executed" or "CPU executed."

One of ordinary skill in the art will appreciate that the acts and symbolically represented operations or instructions include the manipulation of electrical signals by the CPU. An electrical system represents data bits which cause a resulting transformation or reduction of the electrical signals, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data to bits. Examples of computing platforms which may support the preferred embodiments include the "Office Connect 811" ADSL router platform of the 3Com Corporation of Santa Clara, Calif. Other platforms that may support the preferred embodiments include those that incorporate a "C6x" series Digital Signal Processor ("DSP") manufactured by Texas Instruments of Dallas, Tex., as their CPUs. Other CPUs on which the preferred embodiments may run include the "1827" DSP manufactured by Analog Devices of Norwood, Mass. However, it should be understood that the preferred embodiments are not limited to the above-mentioned platforms or CPUs and that other platforms and CPUs may support the described methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system.

Discrete Multi-Tone Modulation

The ADSL modem 26 and the ATU 18 modulate data for transmission as a G.Lite signal and demodulate a received G.Lite signal back into data. It is understood that in a typical ADSL configuration, each end of the communication channel uses both a transmitter and a receiver, making an ADSL transceiver. An ADSL transmitter typically employs a multicarrier modulator, utilizing Discrete Multi-Tone ("DMT") modulation. The DMT modulator typically maps the data values to symbols specified by the magnitude and phase of each carrier, and then performs an inverse discrete Fourier transform ("IDFT") over a symbol frame. The transceiver then transmits the time domain sequence over the customer loop 22; the time domain sequence also includes the effects of the subscriber line twisted pair wire and the analog components and amplifiers of the analog front ends of the ADSL transceivers. At the other end of the communication channel, an ADSL receiver demodulates the signal back into data.

An ADSL receiver includes a DMT demodulator. The demodulator typically uses a discrete Fourier transform ("DFT"), for which there are many algorithms, to recover the magnitude and phase of each carrier, and thereby recover the symbols. As is known in the art, DMT is a method for dividing the available G.Lite bandwidth into 128 sub-channels over the 0 to 552 kHz bandwidth. Essentially, DMT splits the available bandwidth into a large number of sub-channels, each associated with a "bin" that is 4.3125 kHz wide. The frequency response of the customer loop 22 means that some bins have a higher data transport capacity compared to other bins. Data transport capacity is limited by noise on the customer loop 22, including external radio-frequency sources, thermal noise, and cross-talk from other customer loops. By measuring the frequency response of the customer loop 22, the ATU 18 and modem 26 may determine the data carrying capacity of each sub-channel. In this manner, DMT may allocate data so that the throughput of each sub-channel is maximized.

Figure 2:
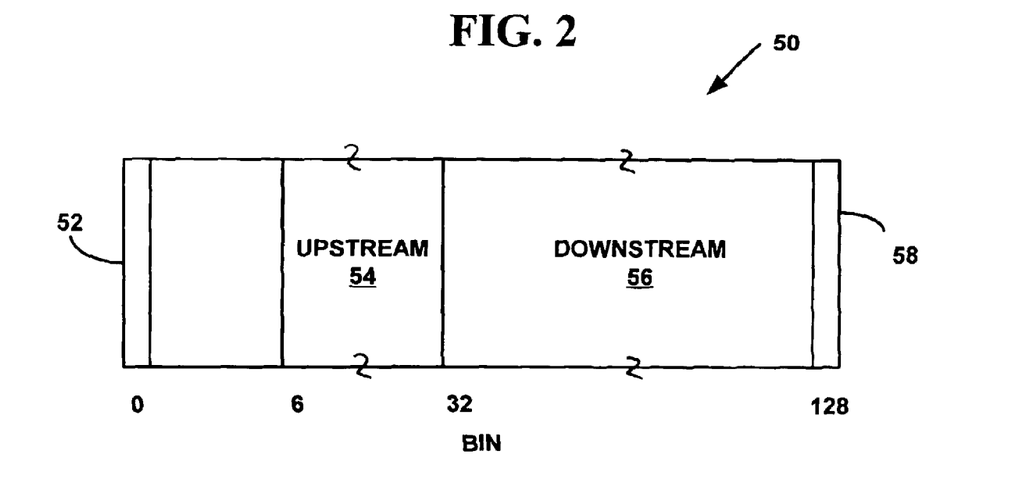
FIG. 2 is a diagram illustrating an available bandwidth for a splitterless ADSL modem.

FIG. 2 is a diagram illustrating the available bandwidth 50 for G.Lite modems such as the ADSL modem 26. Bins 0 to 5, corresponding to 0 to 25.875 kHz, are reserved for POTS signaling 52. The modem 26 transmits upstream data 54 in bins 6 to 31, corresponding to 25.875 kHz to 138 kHz. With the inclusion of echo canceling, these bins may also permit medium speed downstream transfer. In the other direction, the ATU 18 transmits downstream data 56 in bins 32 to 127, corresponding to 138 kHz to 552 kHz. Finally, bin 128 corresponds to the Nyquist frequency 58 for the ADSL signal and no data is transmitted in this bin.

An Initialization Sequence procedure, also known as an initialization procedure, occurs with G.Lite modems to determine attributes of the connecting channel and to establish transmission and processing characteristics suitable to that channel. As known to those skilled in the ADSL art, during the Initialization Sequence procedure, the ATU 18 and ADSL modem 26 exchange expected far-end transmitter settings. Typically, they communicate to each other's far-end transmitter the number of bits and relative power levels that are to be used on each DMT subcarrier. Each transceiver produces and responds to a specific set of precisely timed signals, and determines channel attributes and establishes transmission characteristics. A successful Initialization Sequence procedure results in the ATU 18 and ADSL modem 26 reaching a data transfer mode, known as Showtime. Once the ATU 18 and ADSL modem 26 reach Showtime, they have established modulation schemes for the channel attributes. The ATU 18 and ADSL modem 26 store these modulation schemes, which they may select again during a Fast Retrain procedure.

A Fast Retrain procedure occurs in G.Lite modems to adapt transmission characteristics to changing customer loop 22 conditions, such as may be caused by transitions in the NLD 30, e.g., telephone on/off hook transitions. As known to those skilled in the ADSL art, during the Fast Retrain procedure the ATU 18 sends a predetermined series of tones to the ADSL modem 26. The modem 26 at the other end of the customer loop 22 receives the tones and measures the power of the signal received in each bin. From these measurements, the modem 26 may determine the frequency response of the customer loop 22. From this, the modem 26 determines the signal-to-noise ratio ("SNR") in each bin and hence derives a value for the maximum data throughput for that bin. The modem 26 may then independently select a downstream modulation scheme from a set of previously negotiated modulation schemes to optimize the throughput for the downstream transmission bins.

Similarly, the modem 26 sends a predetermined series of tones which are received by the ATU 18. The ATU 18 may also determine the maximum data throughput for each bin. The ATU 18 may then independently select an upstream modulation scheme from a set of previously negotiated modulation schemes to optimize the throughput for the upstream transmission bins. During the above-described Fast Retrain procedure, the modem 26 and the ATU 18 set power levels for transmission to and from each other.

Noise Reduction

The ADSL modem 26 generates downstream noise for a variety of NLDs 30, which may include both on and off-hook telephones. The upstream DMT transmissions from the modem 26 reach the NLD 30 through the local customer loop 22 and interact with the electronics in the NLD 30. The noise is a result of a non-linear response of the NLD 30 to frequencies above the POTS band in bins 0–31. This interaction with the NLD 30 electronics in the absence of a splitter at the customer site 20 is a common source of the downstream noise. Unless the modem 26 cuts back the power of its output signal, the customer may not obtain an optimal rate for receiving data from the ATU 18 whilst simultaneously using the NLD 30 because the downstream noise seriously degrades the downstream data transfer.

The level of downstream noise generated in the NLD 30 depends on the electronic characteristic of the NLD 30. For example, some telephones are noisier than others. The degree of power cutback of the modem 26 required to suppress the downstream noise from a telephone depends on the model of telephone. Quieter models of telephones include: General Electric models 2-9221 and 2-9295; Lucent/AT&T models 210 and 9200; Bell South model 33012; and White-Westinghouse model WNCP-440. Once the modem 26 cuts the transmitted power back by the required amount, the user may achieve downstream data transfer at an optimal rate.

Figure 3:
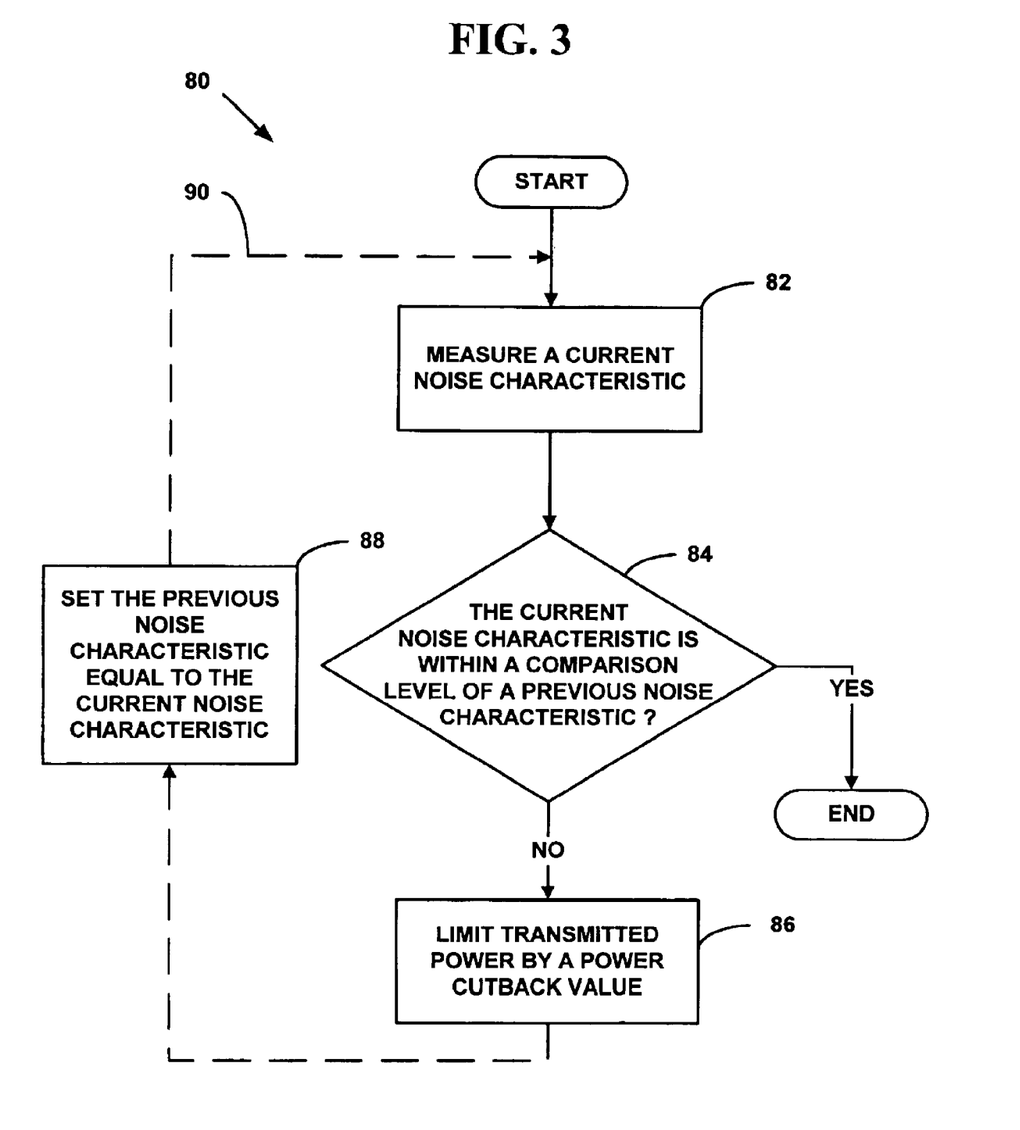
FIG. 3 is a flow diagram illustrating a preferred method for reducing noise from a non-linear device that shares a customer loop with a splitterless ADSL modem.

FIG. 3 is a flow diagram illustrating a preferred method 80 for reducing noise from a NLD 30 that shares a customer loop 22 with a splitterless Asymmetric Digital Subscriber Line modem 26. The method 80 includes measuring a current noise characteristic for the customer loop 22 at step 82. The current noise characteristic is measured by the modem 26. At step 84, the modem 26 makes a determination as to whether the current noise characteristic is within a comparison level of a previous noise characteristic. When the determination is that the current noise characteristic is not within the comparison level of the previous noise characteristic, the modem 26 limits transmitted power by an amount equal to a power cutback value at step 86. In this manner, the method 80 may allow optimal downstream data transfer regardless of what NLD 30 shares the customer loop 22 with the ADSL modem 26.

The degradation of downstream data transfer occurs because the upstream transmissions from the modem 26 interact with the electronics of the NLD 30. For a telephone, this occurs while the telephone is both on and off-hook, and manifests itself in the downstream band as noise. This noise interferes with legitimate downstream data transmissions, causes transmission errors, and hence reduces the data transfer rate.

In another preferred method, also illustrated in FIG. 3, the modem 26 sets the previous noise characteristic equal to the current noise characteristic at step 88. The modem 26 repeats 90 the steps of measuring the current noise characteristic at step 82, making the determination at step 84, and limiting transmitted power at step 86 until the current noise characteristic is within the comparison level of the previous noise characteristic. This preferred method cuts back the power transmitted upstream from the modem 26 in steps until the noise level in the downstream band is sufficiently low that the downstream signal is no longer substantially degraded by the NLD 30.

To determine how far back to cut the modem's 26 power, the modem 26 compares a noise characteristic for the downstream band when the modem 26 is transmitting at its current power level with a previously measured noise characteristic for when the modem 26 was transmitting at a high power level at step 84. The modem 26 reduces the transmit power at step 86 and repeats 90 the process. When the downstream noise is no longer reduced by more than the comparison level by reducing the upstream transmit power level, the modem 26 is transmitting at the optimal upstream transmit power for maximizing the downstream data. Since both the current and previous upstream transmit power levels produce essentially the same downstream noise, the modem 26 uses the larger of the two power levels for the transmit power level to also provide the maximum upstream data transfer rate.

Fast Retrain

In a preferred embodiment, the modem 26 measures the downstream noise characteristics in response to Fast Retrain tones. Fast Retrain, as mentioned above, is a series of tones, power levels, and procedures that allow G.lite modems to modify their transmission characteristics before entering a data transfer mode. Either the ATU 18 or the ADSL modem 26 may initiate a Fast Retrain procedure.

In accordance with preferred embodiments, an ADSL modem 26 may initiate a Fast Retrain procedure under two circumstances. A first circumstance is when the modem 26 is starting up. The modem 26 requests an entry to Fast Retrain for the purpose of measuring a noise characteristic of the customer loop 22. This entry is made from a handshake protocol, known to those skilled in the art as "G.hs," which is running on the CPU in the modem 26. In one exemplary preferred embodiment, the current noise characteristic referred to in step 82 is the total power measured by the modem 26 in the downstream band while the modem 26 is transmitting R-MEDLEY tones. Preferably, the modem 26 measures the total power when it is repeatedly transmitting the thirty-eighth symbol of the R-MEDLEY series of tones because the thirty-eighth symbol has the largest peak-to-average ratio of any of the R-MEDLEY symbols. R-MEDLEY is described in Section 11 of ITU-T Recommendation G.992, and G.hs is described in ITU-T Recommendation G.994.1, both of which are incorporated herein by reference.

Hardware on the modem 26 determines whether the NLD 30 is in the same circuit as the modem 26, e.g., a telephone is on-hook or off-hook. Upon detecting that the NLD 30 has changed state, e.g. the telephone going from on-hook to off-hook or vice versa, the modem 26 stops sending data and begins sending an R-RECOV signal. R-RECOV is a single tone signal corresponding to sub-carrier bin 20 without a cyclic prefix. The modem 26 transmits R-RECOV at its nominal power (−38 decibels below one milliwatt per. Hertz ("dBm/Hz")). When the ATU 18 detects the R-RECOV signal, it stops sending data and begins sending a C-RECOV signal. C-RECOV is a single tone signal corresponding to sub-carrier bin 68 without a cyclic prefix accompanied by a pilot sub-carrier in bin 64. The ATU 18 transmits the C-RECOV signal at its we nominal power (−40 dBm/Hz). The ATU 18 sends the C-RECOV for exactly 64 symbols, at which point the modem 26 and the ATU 18 begin exchanging the Fast Retrain signals.

The second circumstance for Fast Retrain is when the ATU 18 and modem 26 are in data transfer mode, also known as "Showtime" mode to those familiar with G.992. If the modem 26 detects the NLD 30 changing state, it initiates the Fast Retrain procedure according to the guidelines in Section 12.3 of ITU-T Recommendation G.992. The modem 26 initiates the Fast Retrain procedure for purpose of measuring a downstream noise characteristic of the customer loop 22 when the NLD 30 has changed state. As is known in the art, G.992 defines Fast Retrain to include an R-LINE-PROBE section, which may be defined by a vendor. In one preferred embodiment, the modem 26 transmits an R-MEDLEY signal during the R-LINE-PROBE section of the Fast Retrain procedure. Preferably, the R-MEDLEY signal is the thirty-eighth symbol of the R-MEDLEY series of tones. In this way, the modem 26 may measure the current noise characteristic for the downstream channel.

Figure 4:
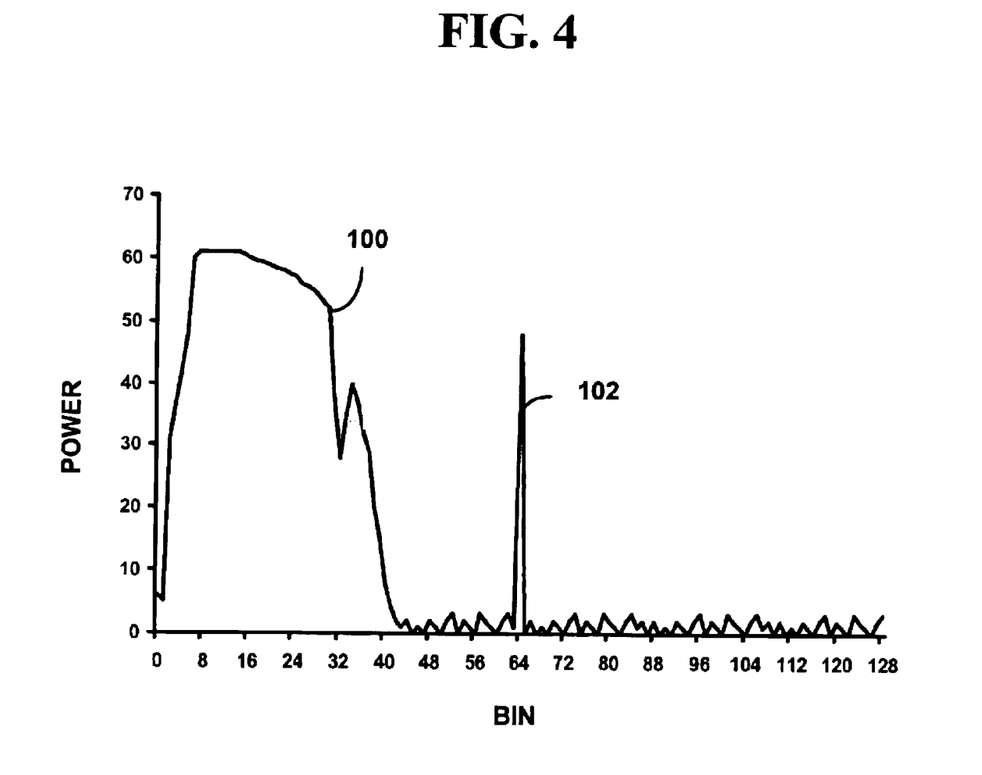
FIG. 4 is a graph illustrating an envelope of a typical R-MEDLEY signal.

FIG. 4 is a graph illustrating an envelope 100 of a typical R-MEDLEY signal. The envelope 100 represents a distribution of power measured at the modem 26 that is measured logarithmically with respect to the nominal power value. The signal illustrated in FIG. 4 is that measured at an ADSL modem 26 on a 24 American Wire Gauge ("AWG") telephone line that is 4000 feet long. As shown in FIG. 4, the modem 26 transmits the R-MEDLEY signal in the upstream bins 7–32, and the ATU 18 transmits a pilot signal C-PILOT 102 at bin 64. Bins 44–71, in contrast, represent a part of the downstream signal spectrum over which the signal is reasonably quiet and stable. The modem 26 may therefore exploit this stability and may examine this part of the spectrum to determine the level of noise in the downstream channel.

Power Cutback

In another preferred embodiment, the noise characteristic of the customer loop 22 is a measure of how much power is in bins 44–71, while the modem 26 transmits a series of R-MEDLEY tones. Preferably, the modem 26 measures the power while transmitting the thirty-eighth symbol of the R-MEDLEY series of tones. The first time that the modem 26 ascertains the power in these bins at step 82, i.e. the first time round the iterative loop 82–90, the modem 26 transmits at the maximum allowable upstream transmitted power level. This measurement provides a baseline for the downstream noise and the modem 26 may store this power value as the previous noise characteristic. The modem 26 again measures the power in the downstream band, at step 82, but this time with a reduced upstream transmit power level. A comparison of both power measurements may indicate how the presence of the NLD 30 influences downstream transmission characteristics of the local customer loop 22 by bleeding some of the upstream signal into the downstream channel.

The power density in each bin is calculated by squaring the real and imaginary values produced by a Fast Fourier Transform ("FFT") process, and adding the two values together. Accumulating these values over 54 repetitions of the R-MEDLEY symbol from bin 44 to bin 71, the modem 26 may derive a value for the average power density in each bin. The modem 26 may sum these average power densities over bins 44 through 71 to obtain a value for the total power in the downstream signal spectrum. In another preferred embodiment, the modem 26 may convert the value of the total power to a logarithmic power value, as is known to those skilled in the art of ADSL modems. For example, the modem 26 may convert the total power value by taking a base two logarithm of the total power value and multiplying by a conversion factor. In yet another preferred embodiment, the modem 26 may set the comparison level for determining if the noise power has reduced significantly to approximately 0.75 dB. When the noise power has reduced less then this comparison level, farther reducing the upstream transmit power will no longer significantly reduce the noise power.

In another preferred embodiment, the modem 26 does not include the power of the pilot tone 102 in the summation. Thus the modem 26 determines the quality of downstream transmission from the ATU 18 by measuring how much the R-MEDLEY signals interact with the NLD 30 and bleed into the downstream channel.

At step 84 of the method 80, the modem 26 compares two noise characteristics to determine whether it should cut back its transmitted power. In accordance with the above-described preferred embodiments, the modem 26 compares the total power value summed from bin 44 to bin 71 for the current upstream transmit power with the total power value summed from bin 44 to bin 71 for the incrementally larger, previous upstream transmit power. If the previous power value is significantly greater than the current power value, as evidenced by a power difference of more than the comparison level, there is still too much signal bleeding into the downstream band and corrupting the downstream data transfer from the ATU 18. Thus the modem 26 may cut back the power of its upstream transmissions to reduce the amount of noise interfering with the downstream transmissions.

The modem 26 implements the power cutback at step 86. In one exemplary embodiment, the modem 26 cuts back its transmitted power by approximately four deciBels each time it is required to do so. The power cutback value is measured with respect to the nominal transmitted power value of −38 dBm/Hz for the modem 26. The modem 26 repeats 90 measuring the noise characteristic and determining, at step 84, whether the associated power value is significantly less than the previous power value. If the power value is significantly less than the previous power value, the modem 26 again cuts back its transmitted power by approximately another four decibels. Steps 82, 84, and 86 are preferably repeated until the noise characteristic is not significantly less than the previous noise characteristic. Once the current noise characteristic is not significantly less than the previous noise characteristic, the downstream noise no longer significantly degrades the downstream signal, thus providing optimal data transfer in the downstream direction.

Figure 5:
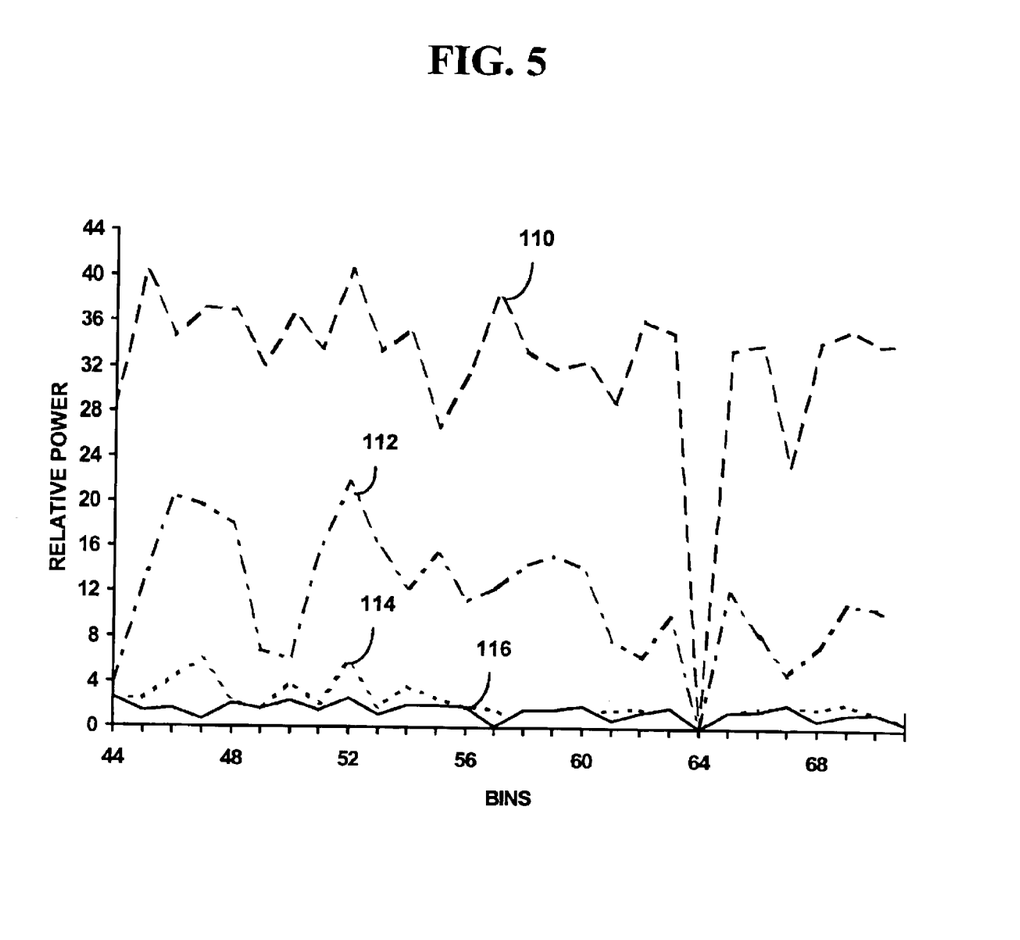
FIG. 5 is a graph illustrating the relative powers of the downstream noise for a noisy telephone while cutting back upstream transmit power.

As an illustrative example, FIG. 5 is a graph illustrating the relative powers of the downstream noise for a noisy telephone 30 while cutting back upstream transmit power. Each line 110–116 represents the power of noise in the downstream signal for a selection of values of the cutback in the upstream transmit power. For example, the dashed line 110 represents the power of noise in the bins when there is no power cutback of the modem's 26 transmitter. When the modem's 26 power is cut back by approximately 4 dB, as indicated by the dot-dashed line 112, the noise that bleeds into the downstream signal is typically reduced by about 20 dB. A power cutback of 12 dB, as shown by the dotted line 114, further reduces the downstream noise, as does a power cutback of 20 dB, as shown by the solid line 116.

Figure 6:
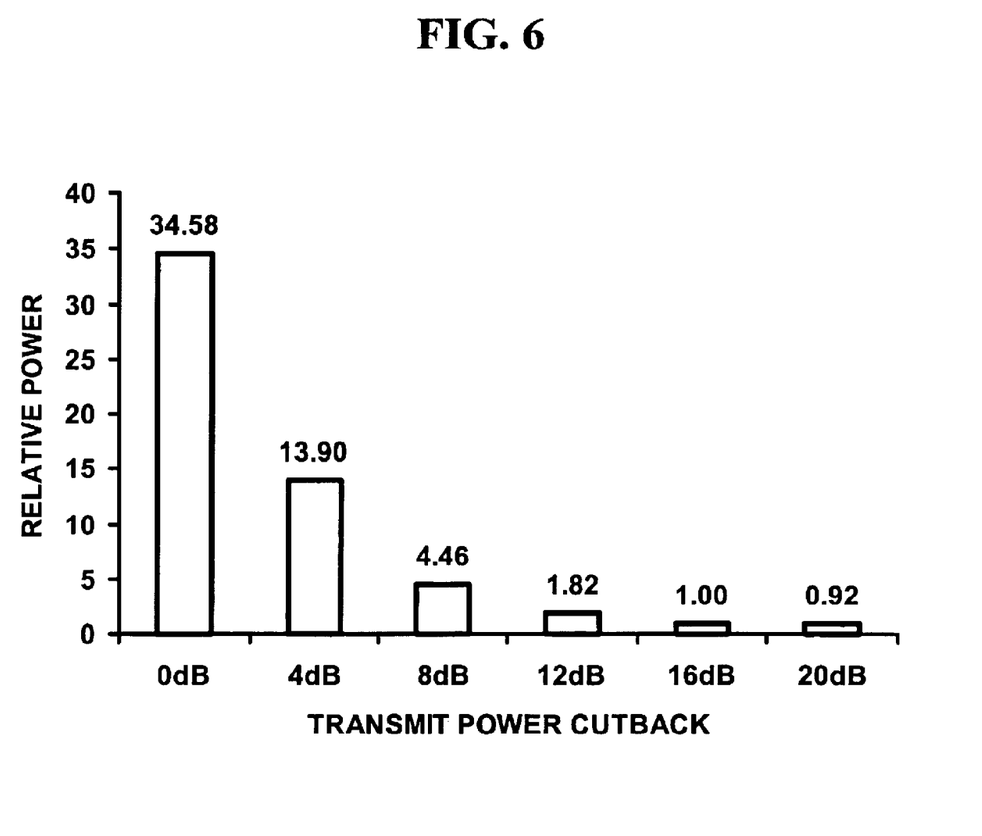
FIG. 6 is a bar graph illustrating the total power values obtained by summing the power in the bins depicted in FIG. 5.

FIG. 6 is a bar graph illustrating the total power values obtained by summing the power in the bins depicted in FIG. 5. For example, for 0 dB of power cutback, the sum of the power over the bins illustrated by the dashed line 110 of FIG. 5 yields a total power value of 34.58 dB. Similarly, for 4 dB of power cutback, the sum of the power over the bins illustrated by the dot-dashed line 112 of FIG. 5 yields a total noise power value of 13.90 dB. In this manner, as can be seen in FIG. 6, there is also 4.46 dB of total noise power for 8 dB power cutback, 1.82 dB of total noise power for 12 dB of power cutback, 1.00 dB of total noise power for 16 dB of power cutback, and 0.92 dB of total noise power for 200 dB of transmit cutback. As illustrated in FIG. 6, comparing the noise power for 12 dB of power cutback of the modem's 26 transmitter with the noise power for 16 dB of power cutback indicates that the modem's 26 transmit power level still has a significant effect on the power of the noise in the downstream band. A comparison of the total noise power between 16 dB and 20 dB cutbacks, however, indicates that the power of the modem's 26 transmitter no longer has a significant effect on the downstream noise power. The measured noise characteristics are less than the comparison level, approximately 0.75 dB, apart. When the modem 26 determines that there is no significant difference between the current downstream noise characteristic and the previous downstream noise characteristic at step 84 of the method 80, the modem 26 remains transmitting with the previous power cutback because both transmitter power levels effectively produce the same amount of downstream noise.

The method 80 may perform the cutbacks during the R-LINE-PROBE section of Fast Retrain. In a preferred embodiment, each cycle around the steps 82, 84, and 86 of the method 80 takes 62 repetitions of the thirty-eighth symbol of the R-MEDLEY series of tones. During the first 62 repetitions, the modem 26 measures the power density values in the bins of the downstream spectrum, such as between bin 44 and bin 71, and sums the measured value to obtain the power value. If the downstream noise characteristic is still significantly different than the previous noise characteristic, the modem 26 takes another 62 repetitions to perform another measurement and power cutback. The maximum cutback may be 24 dB from the nominal power level.

It should be understood, however, that the present invention is not restricted to these power cutback values and that other values are possible. Moreover, it should be understood that the present invention is not restricted to the method 80 of power cutback of FIG. 3 and that other methods of implementing a power cutback are possible.

It should be understood that the programs, processes, methods, systems and apparatus described herein are not related or limited to any particular type of computer apparatus (hardware or software), unless indicated otherwise. Various types of general purpose or specialized computer apparatus may be used with or perform operations in accordance with the teachings described herein. In particular, it should be noted that some or all of the functions ascribed to the modem 26 in the foregoing description may be alternatively implemented in a general purpose microprocessor or specialized signal processor.

In view of the wide variety of embodiments to which the principles of the invention can be applied, it should be understood that the illustrated embodiments are exemplary only, and should not be taken as limiting the scope of the present invention. For example, the steps of the flow diagrams may be taken in sequences other than those described, and more or fewer elements or components may be used in the block diagrams. The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

The following software appendix includes an implementation of the above-described method. The method is performed by compiling the code and running the code on a C6x digital signal processor. However, it should be understood that other implementations may alternatively be used.

APPENDIX

```
// Author: Marty Staszak
// Company: 3Com
#define SYMCOUNT    62    // number of symbols at each power level
#define FIRSTSYM    54    // point in count down at which we zero data
#define STOPINDEX   14    // power index that we count down to - max
                          //cutback = 2*12=24 dB
#define SLOPE_THRESHOLD       4    // offhook slope comparison threshold
#define BN_INDEX_THRESHOLD    2    // Allow the BN measurement to be within
                                   //one interation
#define DC_VOLTS_THRESHOLD    1    // Allow DC voltage to be within 1/3 Voltd
void TxR_LINE_PROBE( )
{
    // Generate Medley. This is our line probe. We modify the Tx Power
    // using byBNTempIndex.
    GenMedley(R_MEDLEY_LEVEL);
    // Initialize data structures;
    wBNSummary = 0xffff;    // Set to dummy Max Value
    // Clear the data buffer used to store the Line Probe Echo
    MemClear(uLineProbeEchoIntegrator, RX_DETECT_TONES * 4);
    // dump integrators
    // Save the Pga settings
    wPgaSaved = wPgaCtrl; // save old PGA setting to restored later
    AdjustRxPga(0 - RX_GAIN);    // set PGA to 0 Gain
    // Save the Paa settings
    wPaaSaved = wPaaCtrl; // save old Tx Power setting to restored later
    // Set initial Tx power to Nominal
    AdjustTxPaa(0);
    byBNTempIndex  = 0;
    byBNSymCount   = SYMCOUNT;
    pRxProc = RxMeasureTones;    // attach DFT tone integrator
                                 // Called every DMT symbol
    MemClear(xToneIntegrator, RX_DETECT_TONES * 8);
                                 // clear integrators
    pMainSeq       = MeasureBN;  // Called every DMT symbol
    pDetect        = DetectBN;
}
#define  DS_FIRST_DETECT_TONE   40
#define  DS_LAST_DETECT_TONE    71
#define  RX_DETECT_TONES
(RX_LAST_DETECT_TONE - RX_FIRST_DETECT_TONE + 1)
#define RX_FIRST_BN_TONE    44
#define RX_FIRST_BN_OFFSET    (RX_FIRST_BN_TONE - RX_FIRST_DETECT_TONE)
#define TX_RECOV_INCREMENT  2    // the amount by which we increment power
                                 //to recover from
                                 // too much cutback, currently 4 dB
void MeasureBN( )
{
    int j;
    uint32 *pTemp;
    uint32 uTemp;
    wTxPnOffset = 38;    // Repeat Medley symbol with largest spike
                         // Found by looking at every symbol,
                         // Note: REVERB is just the repeat of the first
                         // Medley symbol
    if (--byBNSymCount == 0)
    {
        uTemp = 0;
        // Start with the 6th detected tone, bin 44
        pTemp = uLineProbeEchoIntegrator + RX_FIRST_BN_OFFSET;
        // Accumulate power for all bins of interest
        for (j = RX_FIRST_BN_OFFSET; j < (RX_DETECT_TONES -
                              RX_FIRST_BN_OFFSET); j++, pTemp++)
        {
            // Skip over pilot, Bin 64
            if (j != (C_PILOT_TONE - RX_FIRST_DETECT_TONE))
            // this is pilot; we start at 38 . . .
            {
                uTemp = __sadd(*pTemp>>5, uTemp);
            }
        }
        // convert to MD = 1024logbase2
        wTempBNSummary = LogBase2(uTemp);
        // Look to see if off-hook noise floor
        // is reducing by less then 0.753 dB
        // for a 4 dB reduction is transmitted power
        if ( (((wBNSummary - wTempBNSummary) > 0x100) ||
            (byBNTempIndex != STOPINDEX) )
        {
            wBNSummary = wTempBNSummary;
```

APPENDIX-continued

```
        byBNSymCount   = SYMCOUNT;
        byBNTempIndex  += 2;  // index change of 2 = 4 db
        AdjustTxPaa(byBNTempIndex * 20);
    }
    else
    {
        // found Max transmit power cutback for noise floor;
        byBNTempIndex -= 2;
        PickIndexToUse( );
        ResetBN( );
    }
    }
    // Clear out the data from the first 8 symbols to allow for
    // "smooth" power transition; summarize over 54 symbols
    if (byBNSymCount == FIRSTSYM)
        MemClear(uLineProbeEchoIntegrator, RX_DETECT_TONES * 4);
    // dump integrators
}
void TxR_QUIET_FR1a( )
{
    // Adjust Transmitted Power
    AdjustTxPaa(byPowerIndex * 20);
    GenTone(QUIET_TONE, QUIET_LEVEL);
}
void DetectBN( )
{
    int       j;
    uint32    *pTemp;
    int32 iRe, iIm;
    pTemp = uLineProbeEchoIntegrator;
    for (j = 0; j < RX_DETECT_TONES; j++, pTemp++)
    {
        iRe = xToneIntegrator[j].re>>4;  // get integrated tone vector
        iIm = xToneIntegrator[j].im >>4;
        *pTemp  = _sadd((iRe * iRe), *pTemp);
        *pTemp  = _sadd((iIm * iIm), *pTemp);
    }
    MemClear(xToneIntegrator, RX_DETECT_TONES * 8);
    // dump integrators
}
far void RxMeasureTones( )
{
    int32 i;
    for (i = 0; i < RX_DETECT_TONES; i++)
    {
        MeasureTiming(nHbfOut, xCosSin, RX_FIRST_DETECT_TONE + i,
            xToneIntegrator[i]);
    }
    // detect selected entity
    pDetect( );
}
far void MeasureTiming(int16 nInput[ ], cplx16 xCosSin[ ],
                                    int32 iTone, cplx32 xIntegrator)
{
    // perform DFT on the tone specified by iTone
}
```

We claim:

1. A method for reducing noise from a non-linear device that shares a customer loop with a splitterless Asymmetric Digital Subscriber Line modem, the method comprising the steps of:

measuring a current noise characteristic for the customer loop, wherein the current noise characteristic is measured by the modem, wherein measuring the current noise characteristic further comprises transmitting a plurality of tones from the modem to a central office over the customer loop, wherein the plurality of tones are Fast Retrain R-MEDLEY tones, and wherein the R-MEDLEY tones are repetitions of a thirty-eighth symbol of R-MEDLEY;

making a determination as to whether the current noise characteristic is within a comparison level of a previous noise characteristic; and when the determination is that the current noise characteristic is not within the comparison level of the previous noise characteristic, limiting transmitted power from the modem by an amount equal to a power cutback value, wherein limiting transmitted power comprises reducing power across transmit bins.

2. A computer readable medium having stored therein instructions for causing a central processing unit to execute the method of claim 1.

3. The method of claim 1 further comprising the steps of:

setting the previous noise characteristic equal to the current noise characteristic; and repeating the steps of measuring the current noise characteristic, making the determination, and limiting transmitted power until the current noise characteristic is within the comparison level of the previous noise characteristic.

4. The method of claim 1, wherein the measuring step comprises the steps of:
- transmitting a plurality of tone from the modem to a central office over the customer loop; and
- calculating a power value in response to transmitting the plurality of tones, wherein the current noise characteristic is the power value.

5. The method of claim 4 wherein the stop of calculating the power value comprises the steps of:
- measuring a plurality of power density values for a plurality of bins, wherein the plurality of bins range from a first bin to a second bin;
- obtaining the power value by summing the plurality of power density values.

6. The method of claim 5 wherein the plurality of bins excludes a bin associated with a pilot tone.

7. The method of claim 4 wherein the step of calculating the power value comprises:
- measuring a plurality of power density values for a plurality of bins, wherein the plurality of bins range from a first bin to a second bin;
- summing the plurality of power density values to derive a summed power value; and
- obtaining the power value by calculating a logarithm of the summed power value.

8. The method of claim 7 wherein the plurality of bins excludes a bin associated with a pilot tone.

9. The method of claim 1 wherein the non-linear device is a telephone.

10. The method of claim 1, wherein the transmitted power from the modem is measured with respect to a nominal transmitted power for the modem.

11. The method of claim 1 wherein the comparison level is approximately 0.75 deciBels.

12. The method of claim 1 wherein the power cutback value is approximately 4 deciBels.

13. A method for reducing noise from a non-linear device that shares a customer loop with a splitterless Asymmetric Digital Subscriber Line modem, the method comprising the steps of:
- transmitting a plurality of tones from the modem to a central office over the customer loop;
- measuring a plurality at power density values for a plurality of bins, wherein the plurality of bins range from a first bin to a second bin, and wherein the plurality of power density values characterize the noise in the customer loop;
- obtaining a current power value by summing the plurality of power density values;
- making a determination as to whether the current power value is within a comparison level of a previous power value, wherein the comparison level is approximately 0.75 deciBels; and
- when the determination is mat the current power value is not within a comparison level of the previous power value, limiting transmitted power from the modem by an amount equal to a power cutback value, wherein limiting transmitted power comprises reducing power across transmit bins.

14. A computer readable medium having stored therein instructions for causing a central processing unit to execute the method of claim 13.

15. The method of claim 13 further comprising the steps of:
- setting the previous power value equal to the current power value; and
- repeating the steps of transmitting the plurality of tones, measuring the plurality of power density values, obtaining the current power value, making the determination, and limiting transmitted power until the current power value is within the comparison level of the previous power value.

16. The method of claim 13 wherein the non-linear device is a telephone.

17. The method of claim 13 wherein the power cutback level is approximately 4 deciBels.

* * * * *